(12) United States Patent
Demizu

(10) Patent No.: US 6,570,368 B2
(45) Date of Patent: May 27, 2003

(54) SWITCHING POWER SUPPLY DEVICE FOR SUPPRESSING AN INCREASE IN RIPPLE OUTPUT VOLTAGE

(75) Inventor: Hironobu Demizu, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/967,931

(22) Filed: Oct. 2, 2001

(65) Prior Publication Data

US 2002/0057125 A1 May 16, 2002

(30) Foreign Application Priority Data

Oct. 2, 2000 (JP) ........................................ 2000-302237

(51) Int. Cl.[7] ................................................ G05F 1/40
(52) U.S. Cl. ........................................ 323/282; 323/351
(58) Field of Search ................................ 323/282, 284, 323/285, 351

(56) References Cited

U.S. PATENT DOCUMENTS

| | | | |
|---|---|---|---|
| 5,289,361 A | * 2/1994 | Vinciarelli | 363/80 |
| 6,052,790 A | * 4/2000 | Brown | 713/300 |
| 6,100,677 A | * 8/2000 | Farrenkopf | 323/285 |
| 6,229,289 B1 | * 5/2001 | Piovaccari et al. | 323/268 |
| 6,366,066 B1 | * 4/2002 | Wilcox | 323/282 |

FOREIGN PATENT DOCUMENTS

JP U 6-2990 1/1994

* cited by examiner

*Primary Examiner*—Adolf Deneke Berhane
(74) *Attorney, Agent, or Firm*—Birch, Stewart, Kolasch & Birch, LLP.

(57) ABSTRACT

An apparatus is provided to suppress an increase in the ripple voltage inevitable in a conventional switching power supply device used at low temperatures. A switching power supply device is provided that has a DC—DC converter that receives an input voltage and outputs a varying voltage by varying the ratio of on periods to off periods of a switching transistor. An error amplifier compares the output voltage of the DC—DC converter or a divided voltage thereof with a reference voltage and outputs an error voltage. An operator produces a pulse signal according to the error voltage and controls the switching transistor with the pulse signal. A gain control circuit varies the gain of the error amplifier according to at least one of the duty factor of the pulse signal and the ambient temperature.

15 Claims, 10 Drawing Sheets

SWITCHING POWER SUPPLY DEVICE FOR SUPPRESSING AN INCREASE IN RIPPLE OUTPUT VOLTAGE

BACKGROUND OF THE INVENTION

1. Field of the Invention

The present invention relates to a switching power supply device.

2. Description of the Prior Art

An example of a conventional switching power supply device is shown in FIG. 11. The switching power supply device includes a converter portion 100 and a controller portion 200. The switching power supply device converts a direct-current voltage fed in via an input terminal IN into a desired direct-current voltage, and then supplies the thus obtained direct-current voltage to a load resistor RL.

First, the configuration of the converter portion 100 will be described. The converter portion 100 includes a capacitor 1, an NPN-type transistor 2, a diode 3, a coil 4, and an output capacitor 5, which together constitute a step-down type DC—DC converter. The collector of the transistor 2 is connected to the input terminal IN and to one end of the capacitor 1. The emitter of the transistor 2 is connected to the cathode of the diode 3 and to one end of the coil 4.

The end of the coil 4 which is not connected to the transistor 2 is connected to the output capacitor 5, is connected also via an output terminal OUT to the load resistor RL, and is connected also via the output terminal OUT to the resistor R1 (described later) provided in the controller portion 200. The end of the capacitor 1 which is not connected to the transistor 2, the anode of the diode 3, the end of the output capacitor 5 which is not connected to the coil 4, and the end of the load resistor RL which is not connected to the output terminal OUT are each grounded.

Next, the configuration of the controller portion 200 will be described. The controller portion 200 includes an output voltage detection circuit 6, an error amplifier 7, a reference voltage source 8, an operational amplifier 9, an oscillator 10, and a driver circuit 11. The output voltage detection circuit 6 is composed of a resistor R1 and a resistor R2 that is connected in series with the resistor R1. One end of the resistor R1 is connected to the output terminal OUT, and the end of the resistor R2 which is not connected to the resistor R1 is grounded. The node between the resistors R1 and R2 is connected to the inverting input terminal of the error amplifier 7. The non-inverting input terminal of the error amplifier 7 is connected to the reference voltage source 8.

The output terminal of the error amplifier 7 is connected to the non-inverting input terminal of the operational amplifier 9. The inverting input terminal of the operational amplifier 9 is connected to the oscillator 10. The output terminal of the operational amplifier 9 is connected through the driver circuit 11 to the base of the transistor 2.

Next, the operation of the switching power supply device configured as described above will be described. The direct-current voltage fed in via the input terminal IN is first smoothed by the capacitor 1 so as to be formed into an input voltage $V_{IN}$, and is then converted into a pulse voltage by the switching operation of the transistor 2.

When the transistor 2 is in an on state, a current flows from the input terminal IN to the coil 4. As a result, energy is not only accumulated in the coil 4, but also supplied to the load resistor RL. On the other hand, when the transistor 2 is in an off state, the energy accumulated in the coil 4 is supplied through the diode 3 to the load resistor RL. Here, to the output terminal OUT is supplied an output voltage $V_O$ smoothed by the output capacitor 5, and this output voltage $V_O$ is applied to the load resistor RL.

The output voltage $V_O$ of the switching power supply device is fed via the output terminal OUT to the controller portion 200 so as to be subjected to feedback control performed by the controller portion 200. Specifically, according to the output voltage $V_O$ of the switching power supply device, the duty factor, i.e. the ratio of the on periods to the sum of the on and off periods, of the pulse voltage output from the transistor 2 is determined. The output voltage $V_O$ of the switching power supply device is first divided by the output voltage detection circuit 6. The thus divided voltage $V_{adj}$ is then compared with a reference voltage $V_{ref}(=1.25 \text{ V})$ output from the reference voltage source 8 by the error amplifier 7.

The error amplifier 7 amplifies the difference between the divided voltage $V_{adj}$ and the reference voltage $V_{ref}$, and outputs an output voltage signal $V_A$ to the operational amplifier 9. The operational amplifier 9, in synchronism with the output voltage $V_{OSC}$ (a triangular wave) of the oscillator 10, outputs a PWM signal $V_{PWM}$ corresponding to the output voltage signal $V_A$. Specifically, when the output voltage signal $V_A$ from the error amplifier 7 is higher than the output voltage $V_{OSC}$ from the oscillator 10, the operational amplifier 9 outputs a high level as the PWM signal $V_{PWM}$, and otherwise, i.e. when the output voltage signal $V_A$ from the error amplifier 7 is not higher than the output voltage $V_{OSC}$ from the oscillator 10, the operational amplifier 9 outputs a low level as the PWM signal $V_{PWM}$. Here, the frequency of the output voltage $V_{OSC}$ (a triangular wave) oscillated by the oscillator 10 is set to be 100 kHz to prevent audible noise. Moreover, the maximum and minimum levels of the output voltage $V_{OSC}$ (a triangular wave) oscillated by the oscillator 10 are set to be 1.75 V and 0.75 V, respectively.

The PWM signal $V_{PWM}$ is fed to the driver circuit 11, and the driver circuit 11, according to the PWM signal $V_{PWM}$, supplies a current to the base of the transistor 2 and thereby controls the switching operation of the transistor 2. Specifically, when the driver circuit 11 receives a high level as the PWM signal $V_{PWM}$ from the operational amplifier 9, it feeds a current $I_B$ to the base of the transistor 2 to bring the transistor 2 into an on state. On the other hand, when the driver circuit 11 receives a low level as the PWM signal $V_{PWM}$, it turns the current $I_B$ supplied to the base of the transistor 2 to zero and thereby brings the transistor 2 into an off state. In this way, the ratio of the on periods $t_{ON}$ to the off periods $t_{OFF}$ of the transistor 2 is controlled in such a way that the output voltage $V_O$ of the switching power supply device which is supplied to the load resistor RL is stabilized at a predetermined level (5 V). The duty factor "duty" of the PWM signal $V_{PWM}$ and of the transistor 2 is given by formula (1) below.

$$\text{duty} = \frac{t_{ON}}{t_{ON} + t_{OFF}} \times 100 = \frac{V_O}{V_{IN}} \times 100 \qquad (1)$$

In the on periods $t_{ON}$, in which the transistor 2 is in an on state, the gradient of the current $I_L$ that flows through the coil 4 is positive, and, in the off periods $t_{OFF}$, in which the transistor 2 is in an off state, the gradient of the current $I_L$ that flows through the coil 4 is negative.

To cope with this, as described earlier, a voltage smoothed by the output capacitor 5 is supplied as the output voltage $V_O$ to the load resistor RL. However, equivalent series resistance (hereinafter referred to as ESR) exists in the output capacitor 5, and therefore the output voltage Vo contains a ripple voltage $V_{rms}$, i.e. an alternating-current component. FIG. 12 shows a time chart of the output voltage signal $V_A$ from the error amplifier 7, the output voltage $V_{OSC}$ from the oscillator 10, and the PWM signal $V_{PWM}$ as observed at room temperature (25° C.). The frequency of the PWM signal $V_{PWM}$ is equal to that of the output voltage $V_{OSC}$ from the oscillator 10, and therefore the switching frequency $f_0$ of the transistor 2 is equal to the frequency of the output voltage $V_{OSC}$ from the oscillator 10, i.e. 100 kHz.

However, as the temperature falls, the ESR of the output capacitor 5 increases, and thus, as shown in FIG. 13, the ripple voltage $V_{rms}$ contained in the output voltage $V_O$ increases.

Here, as shown in FIG. 14, the gain $G_{AMP}$ of the error amplifier 7 is fixed at 100 irrespective of the divided voltage $V_{adj}$ fed to its inverting input terminal. Thus, the input-output characteristic of the error amplifier 7, i.e. the relationship between the divided voltage $V_{adj}$ and the output voltage signal $V_A$, is as shown in FIG. 15. On the other hand, the input-output characteristic of the operational amplifier 9, i.e. the relationship between the output voltage signal $V_A$ and the duty factor "duty" of the PWM signal $V_{PWM}$, is as shown in FIG. 16.

In the switching power supply device having these characteristics, a malfunction in which the switching frequency $f_0$ of the transistor 2 becomes equal to half the oscillation frequency of the oscillator 10 occurs when the ripple voltage $V_{adj1}$ contained in the divided voltage $V_{adj}$ fed to the error amplifier 7 and the duty factor "duty" has a relationship as shown in FIG. 17. In general, a switching power supply device provided with a step-down type DC—DC converter is used in the range of duty factors "duty" from 0% to 50%. Thus, as FIG. 17 clearly shows, the lower the duty factor "duty", the lower the ripple voltage $V_{adj1}$ at which the malfunction occurs. That is, the lower the duty factor "duty", the more likely the malfunction occurs.

FIG. 18 shows a diagram in which the ripple voltage $V_{rms}$ contained in the output voltage $V_O$ shown in FIG. 13 is converted into the ripple voltage $V_{adj2}$ contained in the divided voltage $V_{adj}$. It is to be noted that in FIG. 18 is indicated the ripple voltage $V_{10\%}$, as calculated on the basis of FIG. 17, contained in the divided voltage $V_{adj}$ when the malfunction occurs at a duty factor "duty" of 10%. As FIG. 18 clearly shows, at a duty factor "duty" of 10%, a malfunction in which the switching frequency $f_0$ of the transistor 2 becomes equal to half the oscillation frequency of the oscillator 10 occurs at a temperature of −25° C. This is because, as shown in FIG. 19, the ripple voltage contained in the output voltage signal $V_A$ from the error amplifier 7 becomes so high that the amplitude of the output voltage signal $V_A$ becomes greater than that of the output voltage $V_{OSC}$ from the oscillator 10, with the result that the frequency of the PWM signal $V_{PWM}$ becomes equal to twice the frequency of the output voltage $V_{OSC}$ from the oscillator 10.

The ripple voltage $V_{rms}$ contained in the output voltage $V_O$ is inversely proportional to the switching frequency $f_0$ of the transistor 2, and therefore, when the switching frequency $f_0$ of the transistor 2 becomes equal to half the oscillation frequency of the oscillator 10 as described above, the ripple voltage $V_{rms}$ becomes twice as high, degrading the stability of the output voltage $V_O$ and increasing the ripple voltage contained therein.

SUMMARY OF THE INVENTION

An object of the present invention is to provide a switching power supply device of which the output voltage contains no higher ripple voltage even when the switching power supply device is used at low temperatures.

To achieve the above object, according to the present invention, a switching power supply device is provided with a DC—DC converter that receives an input voltage and outputs a varying voltage by varying the ratio of on periods to off periods of a switching transistor, an error amplifier that compares the output voltage of the DC—DC converter or a divided voltage thereof with a reference voltage and outputs an error voltage, an operator that produces a pulse signal according to the error voltage and controls the switching transistor with the pulse signal, and a gain control circuit that varies the gain of the error amplifier according to at least one of the duty factor of the pulse signal and the ambient temperature.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
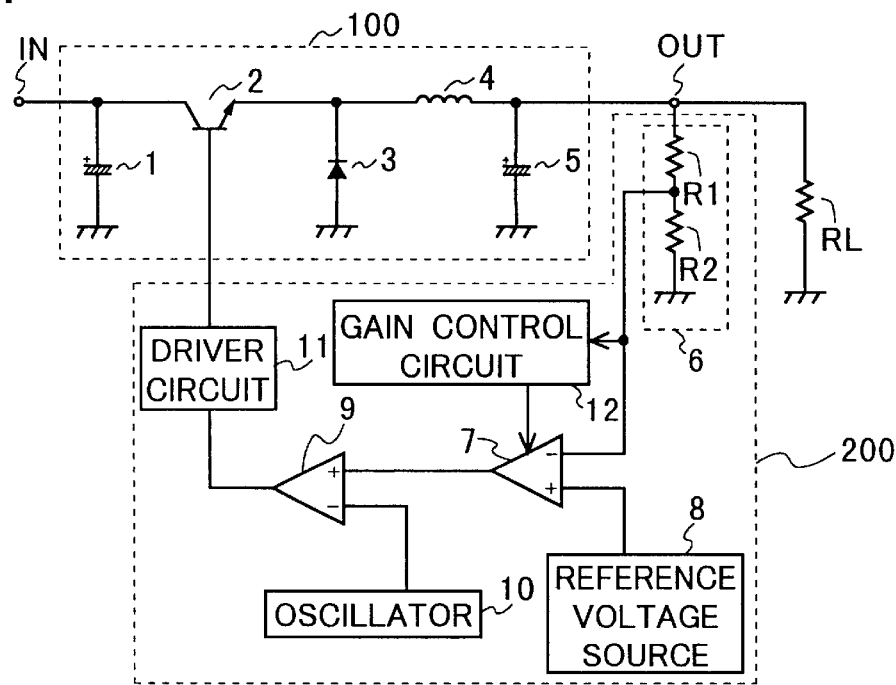
FIG. 1 is a circuit block diagram of the switching power supply device of a first embodiment of the invention.
Figure 4:
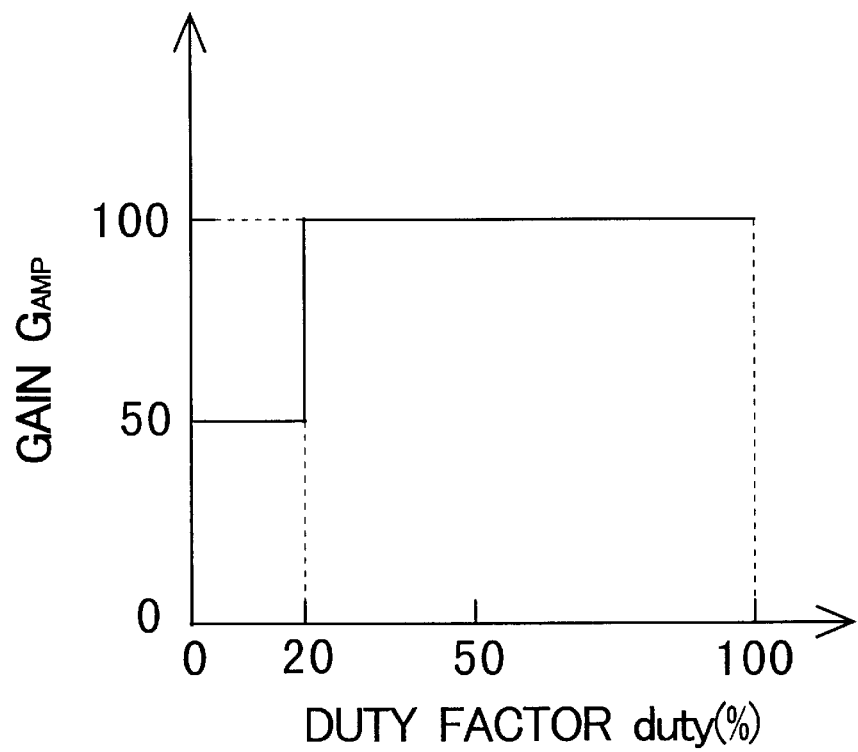
FIG. 4 is a graph showing the gain characteristic of the error amplifier provided in the switching power supply devices shown in FIGS. 1 and 2.
Figure 11:
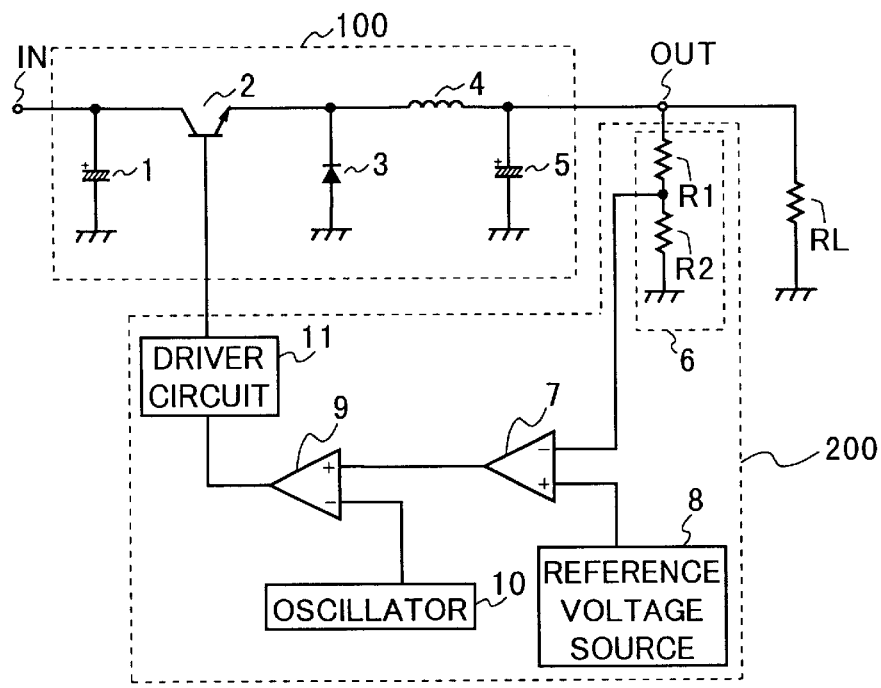
FIG. 11 is a circuit block diagram of a conventional switching power supply device.
Figure 12:
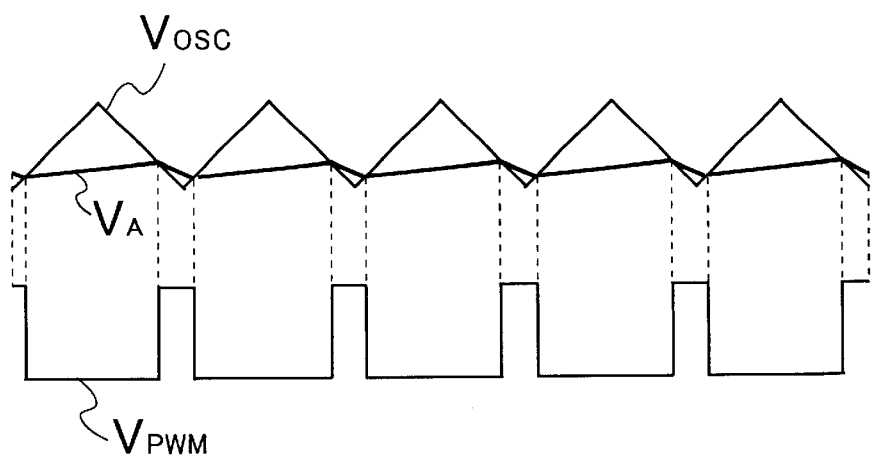
FIG. 12 is a time chart showing the waveforms of relevant signals observed at room temperature in the switching power supply device shown in FIG. 11.
Figure 13:
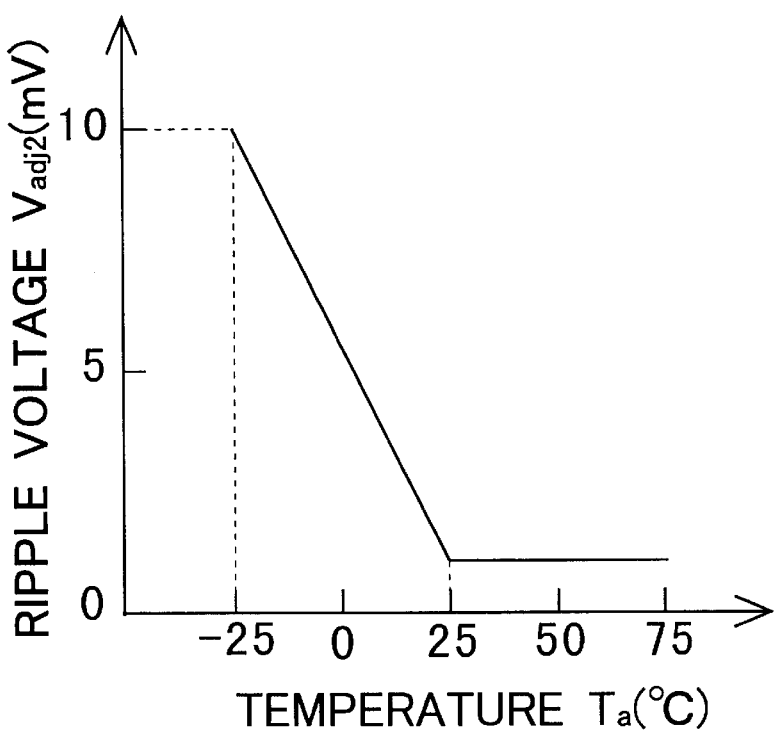
FIG. 13 is a graph showing the temperature characteristic of the ripple voltage contained in the output voltage of the switching power supply device shown in FIG. 11.
Figure 14:
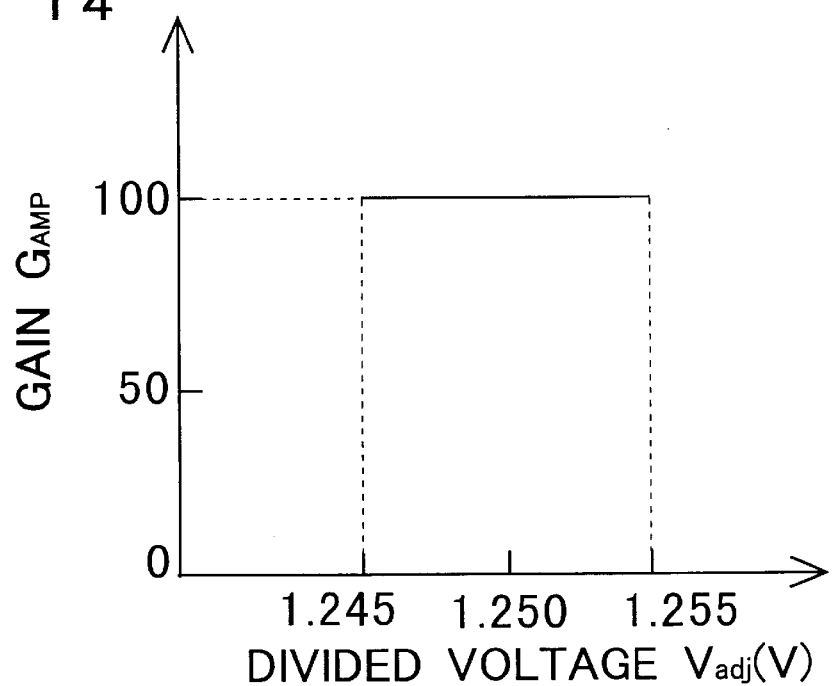
FIG. 14 is a graph showing the gain of the error amplifier provided in the switching power supply device shown in FIG. 11.
Figure 15:
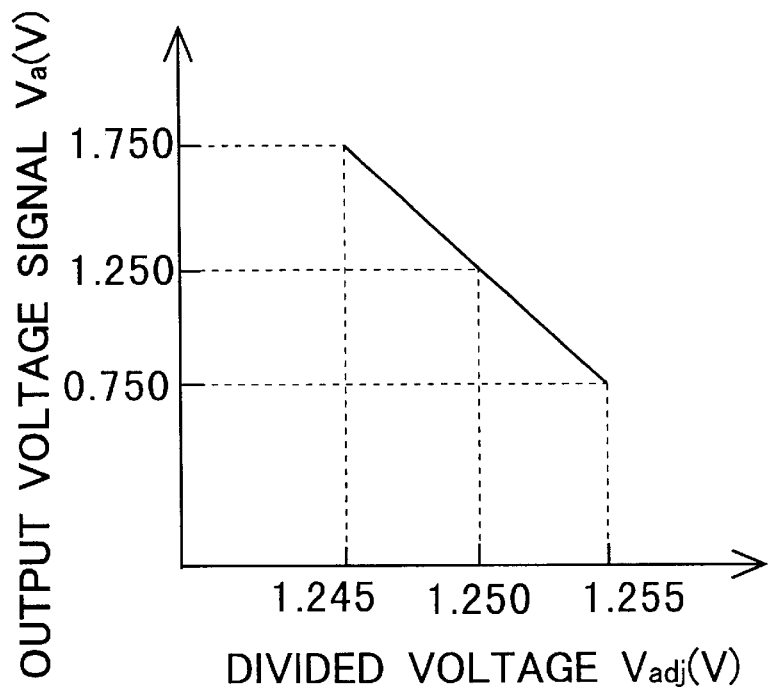
FIG. 15 is a graph showing the input-output characteristic of the error amplifier provided in the switching power supply device shown in FIG. 11.
Figure 16:
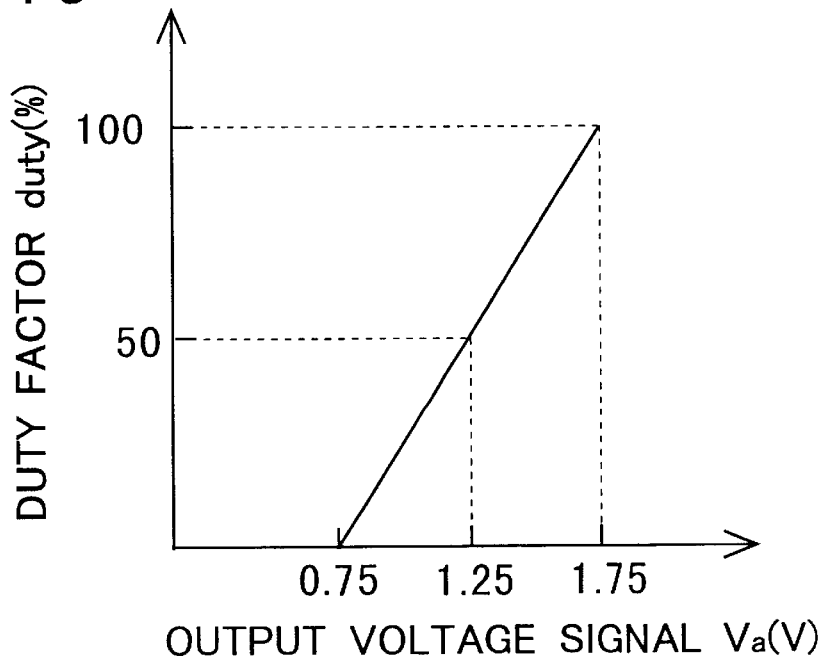
FIG. 16 is a graph showing the input-output characteristic of the operational amplifier provided in the switching power supply device shown in FIG. 11.
Figure 17:
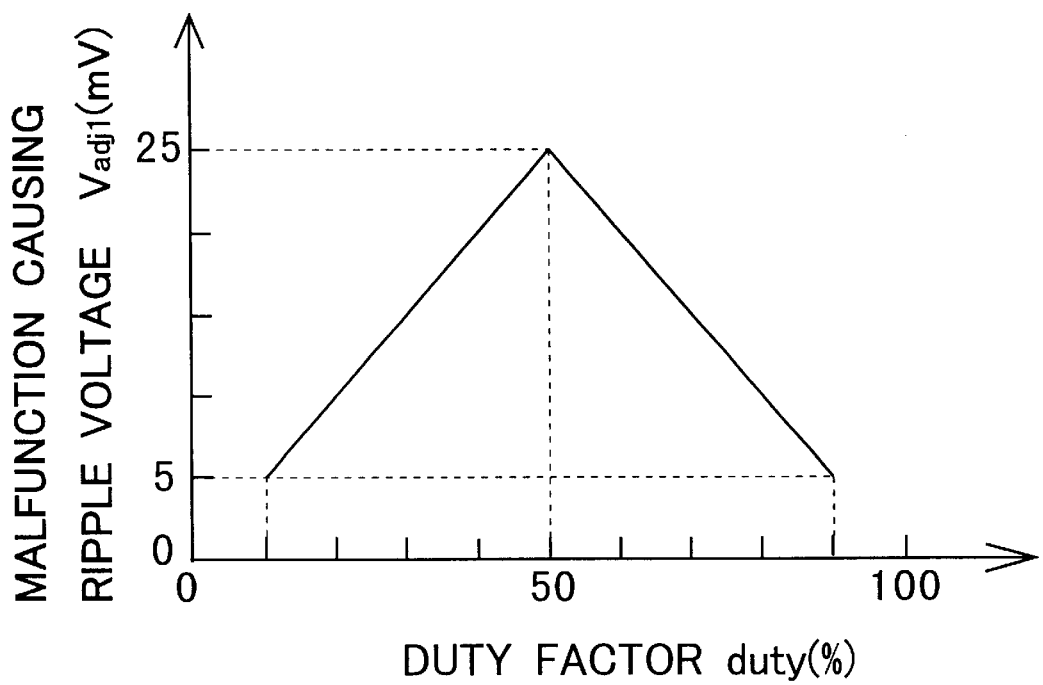
FIG. 17 is a graph showing the relationship between the duty factor and the ripple voltage contained in the divided voltage of the output voltage when a malfunction occurs in the switching power supply device shown in FIG. 11.

First, the switching power supply device of a first embodiment of the invention will be described. FIG. 1 shows the switching power supply device of the first embodiment. In the following descriptions, such circuit elements and blocks as serve the same purposes as in FIG. 11 are identified with the same reference numerals or symbols, and their explanations will not be repeated. Here, the divided voltage $V_{adj}$ of the output voltage $V_O$ from the output voltage detection circuit 6 is fed to a gain control circuit 12, and the gain control circuit 12, according to the divided voltage $V_{adj}$, varies the gain $G_{AMP}$ of the error amplifier 7. Specifically, when the divided voltage $V_{adj}$ is higher than 1.253 V, the gain control circuit 12 sets the gain $G_{AMP}$ of the error amplifier 7 at 100 as in the conventional switching power supply device, and, when the divided voltage $V_{adj}$ is equal to or lower than 1.253 V, the gain control circuit 12 sets the gain $G_{AMP}$ of the error amplifier 7 at 50. Thus, since the divided voltage $V_{adj}$ and the duty factor "duty" have a relationship as shown in FIGS. 15 and 16 described earlier, when the duty factor "duty" is higher than 20%, the gain $G_{AMP}$ of the error amplifier 7 is set at 100, and, when the duty factor "duty" is equal to or lower than 20%, the gain $G_{AMP}$ of the error amplifier 7 is set at 50, as shown in FIG. 4.

Figure 5:
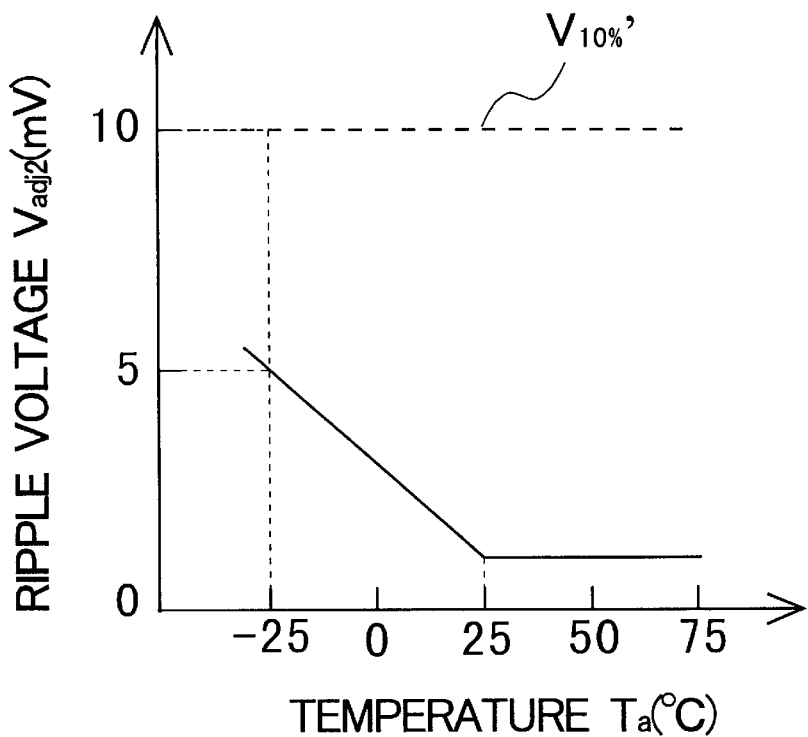
FIG. 5 is a graph showing the temperature characteristic of the ripple voltage contained in the divided voltage of the output voltage of the switching power supply devices shown in FIGS. 1 and 2.
Figure 18:
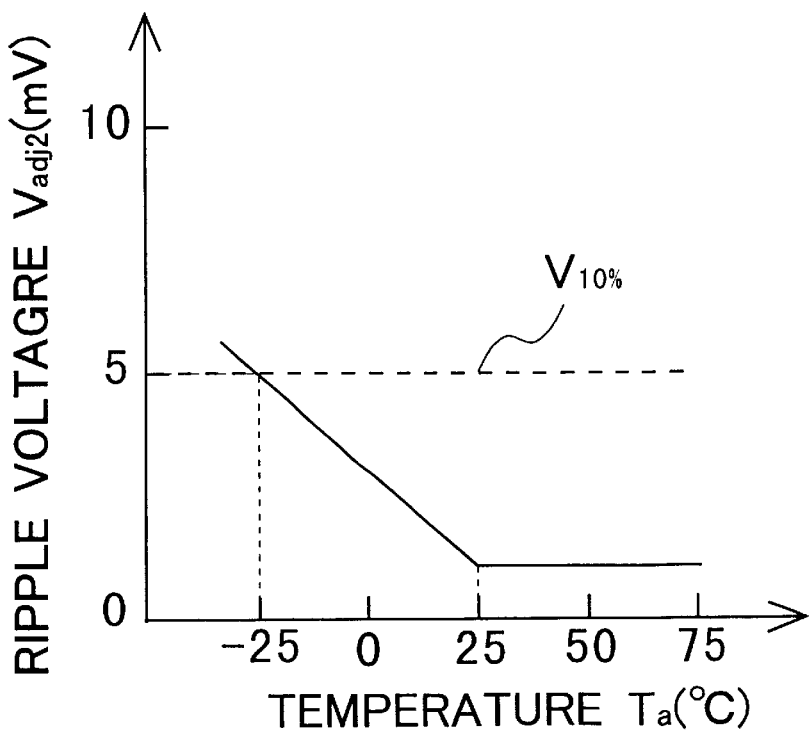
FIG. 18 is a graph showing the temperature characteristic of the ripple voltage contained in the divided voltage of the output voltage of the switching power supply device shown in FIG. 11.
Figure 19:
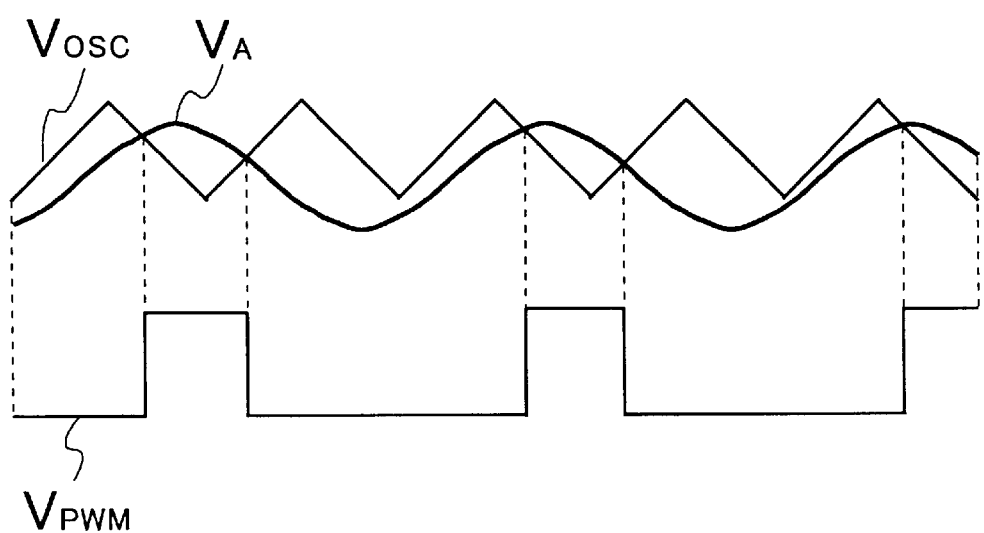
FIG. 19 is a time chart showing the waveforms of relevant signals observed at low temperatures in the switching power supply device shown in FIG. 11.

As a result of this operation, the ripple voltage contained in the divided voltage $V_{adj}$ when a malfunction occurs at a duty factor "duty" of 10 % is now as indicated by $V_{10\%}'$ in FIG. 5, i.e. twice as high as $V_{10\%}$ shown in FIG. 18. Thus, there no longer occurs a malfunction in which the switching frequency $f_0$ of the transistor 2 becomes equal to half the oscillation frequency of the oscillator 10 even at a duty factor of 10% and at a low temperature (−25° C.).

Figure 2:
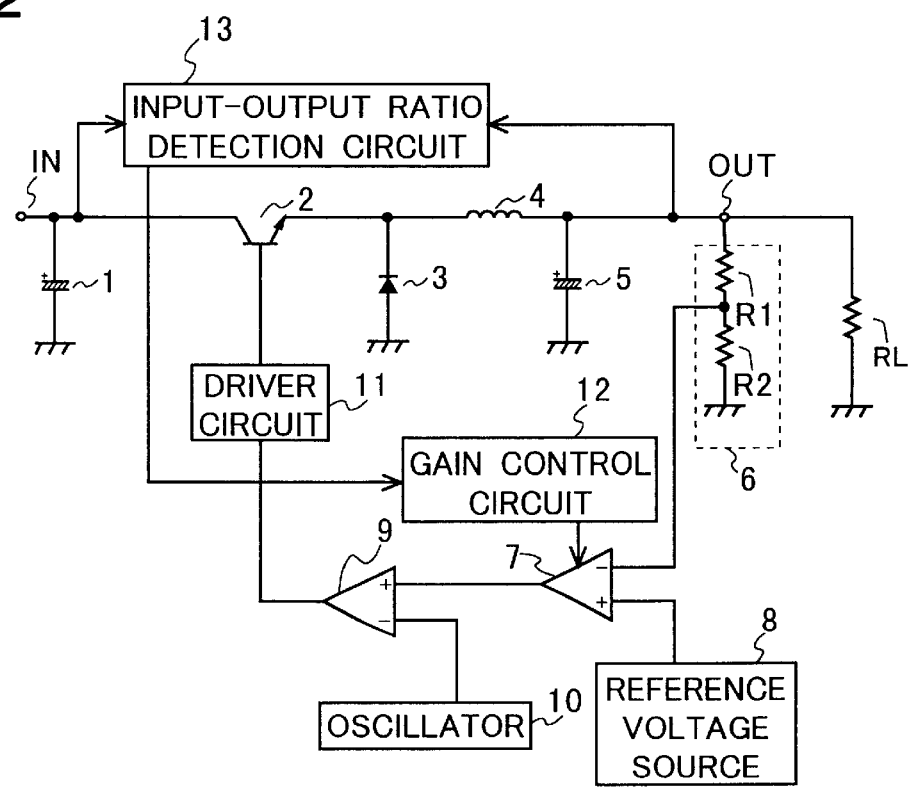
FIG. 2 is a circuit block diagram of the switching power supply device of a second embodiment of the invention.

Next, the switching power supply device of a second embodiment of the invention will be described. FIG. 2 shows the switching power supply device of the second embodiment. In the following descriptions, such circuit elements and blocks as serve the same purposes as in FIG. 11 are identified with the same reference numerals or symbols, and their explanations will not be repeated. Here, the input voltage $V_{IN}$ and the output voltage $V_O$ are fed to an input-output ratio detection circuit 13, which then feeds the input-output ratio $V_{IN}/V_O$ to the gain control circuit 12. The gain control circuit 12, according to the input-output ratio $V_{IN}/V_O$, varies the gain $G_{AMP}$ of the error amplifier 7. Specifically, when the input-output ratio $V_{IN}/V_O$ is lower than 5, the gain control circuit 12 sets the gain $G_{AMP}$ of the error amplifier 7 at 100 as in the conventional switching power supply device, and, when the input-output ratio $V_{IN}/V_O$ is equal to or higher than 5, the gain control circuit 12 sets the gain $G_{AMP}$ of the error amplifier 7 at 50. Thus, since the input-output ratio $V_{IN}/V_O$ and the duty factor "duty" have a relationship as expressed by formula (1) described earlier, when the duty factor "duty" is higher than 20%, the gain $G_{AMP}$ of the error amplifier 7 is set at 100, and, when the duty factor "duty" is equal to or lower than 20%, the gain $G_{AMP}$ of the error amplifier 7 is set at 50, as shown in FIG. 4.

As a result of this operation, the ripple voltage contained in the divided voltage $V_{adj}$ when a malfunction occurs at a duty factor "duty" of 10% is now as indicated by $V_{10\%}'$ in FIG. 5, i.e. twice as high as $V_{10\%}$ shown in FIG. 18. Thus, there no longer occurs a malfunction in which the switching frequency $f_0$ of the transistor 2 becomes equal to half the oscillation frequency of the oscillator 10 even at a duty factor of 10% and at a low temperature (−25° C.).

Figure 8:
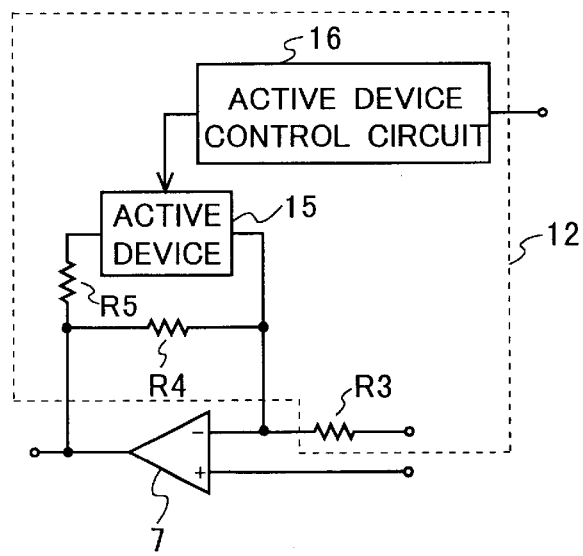
FIG. 8 is a diagram showing an example of the configuration of the gain control circuit provided in the switching power supply devices shown in FIGS. 1 to 3.

Now, an example of the configuration of the gain control circuit 12 provided in the switching power supply devices of the first and second embodiments will be described with reference to FIG. 8. The gain control circuit 12 is provided with resistors R3 to R5, an active device 15, and an active device control circuit 16. The inverting input terminal of the error amplifier 7 is connected through the resistor R4 to the output terminal of the error amplifier 7. The resistor R5 is connected, through the active device 15, in parallel with the resistor R4. Moreover, the resistor R3 is connected to the node between the resistor R4 and the inverting input terminal of the error amplifier 7. As the active device 15, it is possible to use a bipolar transistor, a MOS (metal-oxide semiconductor) transistor, or the like.

The active device control circuit 16 receives, in the case of the switching power supply device of the first embodiment, the divided voltage $V_{adj}$ from the output voltage detection circuit 6 or, in the case of the switching power supply device of the second embodiment, the input-output ratio $V_{IN}/V_O$ from the input-output ratio detection circuit 13. The active device control circuit 16, according to the input signal thus fed thereto, controls the on/off state of the active device 15. When the active device 15 is in an on state, the gain $G_{AMP}$ of the error amplifier 7 is given by formula (2) below, where $R_3$, $R_4$, and $R_5$ represent the resistances of the resistors R3, R4, and R5, respectively.

$$G_{AMP} = \frac{R_4 \times R_5}{(R_4 + R_5) \times R_3} \qquad (2)$$

On the other hand, when the active device 15 is in an off state, the gain $G_{AMP}$ of the error amplifier 7 equals $R_4/R_3$. Thus, by making the resistances of the resistors R4 and R5 equal, it is possible to obtain a gain characteristic as shown in FIG. 4.

The active device control circuit 16 may control the active device 15 not on an on/off basis but on a linear basis. By controlling the active device 15 linearly, it is possible to control the gain $G_{AMP}$ of the error amplifier 7 linearly. Thus, by controlling the gain $G_{AMP}$ of the error amplifier 7 so as to fulfill formula (6) or (8) described later, it is possible to make the total gain of the feedback system of the switching power supply device constant and thereby further enhance the stability thereof.

Now, to formulate the aforementioned condition (expressed by formula (6) or (8)) that makes the total gain of the feedback system of the switching power supply device constant, the amount of feedback $\Delta V_{adj}'$ with respect to the variation $\Delta V_{adj}$ in the divided voltage will be determined. First, on the basis of formula (1), the output voltage $V_O$ is given by $$V_O = V_{IN} \times t_{ON}/T$$

where T represents the period of the PWM signal $V_{PWM}$. Hence, the variation $\Delta V_O$ in the output voltage with respect to the variation $\Delta V_{adj}$ in the divided voltage is given by formula (3) below.

$$\frac{\Delta V_O}{\Delta V_{adj}} = \frac{\Delta V_O}{\Delta V_A} \times \frac{\Delta V_A}{\Delta V_{adj}} \quad (3)$$
$$= \frac{V_{IN}}{T} \times \frac{\Delta t_{ON}}{\Delta V_A} \times \frac{\Delta V_A}{\Delta V_{adj}}$$

On the other hand, the amount of feedback $\Delta V_{adj}'$ with respect to the variation $\Delta V_{adj}$ in the divided voltage is given by formula (4) below.

$$\frac{\Delta V_{adj}'}{\Delta V_{adj}} = \frac{\Delta V_O \times \frac{V_{ref}}{V_O}}{\Delta V_{adj}} \quad (4)$$

With formulae (3) and (4) combined, the amount of feedback $\Delta V_{adj}'$ with respect to the variation $\Delta V_{adj}$ in the divided voltage is given by formula (5) below.

$$\frac{\Delta V_{adj}'}{\Delta V_{adj}} = \frac{V_{IN}}{T} \times \frac{\Delta t_{ON}}{\Delta V_A} \times \frac{\Delta V_A}{\Delta V_{adj}} \times \frac{V_{ref}}{V_O} \quad (5)$$
$$= \frac{V_{IN}}{V_O} \times \frac{1}{T} \times \frac{\Delta t_{ON}}{\Delta V_A} \times G_{AMP} \times V_{ref}$$

The total gain of the feedback system of the switching power supply device can be made constant by making constant the amount of feedback $\Delta V_{adj}'$ with respect to the variation $\Delta V_{adj}$ in the divided voltage. Specifically, in formula (5), the terms $1/T$, $\Delta t_{ON}/\Delta V_A$, and $V_{ref}$ are all constant, and therefore, by controlling the active device 15 linearly so as to fulfill formula (6) below, it is possible to make the total gain of the feedback system of the switching power supply device constant. Here, K represents a constant. This control can be applied to the switching power supply device of the second embodiment.

$$\frac{V_{IN}}{V_O} \times G_{AMP} = K \quad (6)$$

Using the divided voltage $V_{adj}$, the term $V_{IN}/V_O$ can be expressed as formula (7) below.

$$\frac{V_{IN}}{V_O} = 0.5 - G_{AMP} \times (V_{adj} - V_{ref}) \times \frac{\Delta duty}{\Delta V_A} \quad (7)$$

Hence, formula (6) can be expressed as formula (8) below. By controlling the active device 15 linearly so as to fulfill formula (8), it is possible to make the total gain of the feedback system of the switching power supply device constant. This control can be applied to the switching power supply device of the first embodiment.

$$\left[ 0.5 - G_{AMP} \times (V_{adj} - V_{ref}) \times \frac{\Delta duty}{\Delta V_A} \right] \times G_{AMP} = K \quad (8)$$

Figure 3:
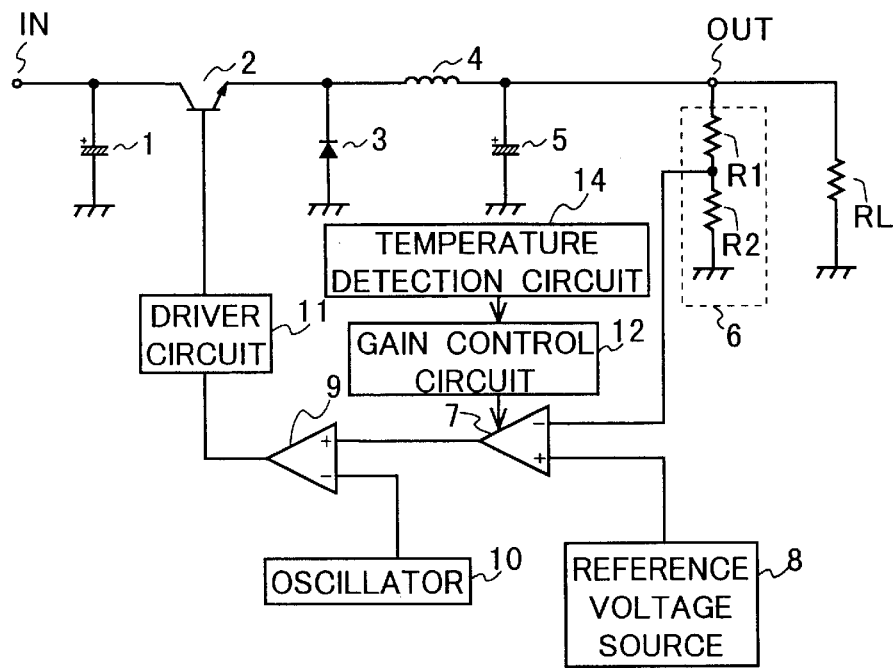
FIG. 3 is a circuit block diagram of the switching power supply device of a third embodiment of the invention.
Figure 6:
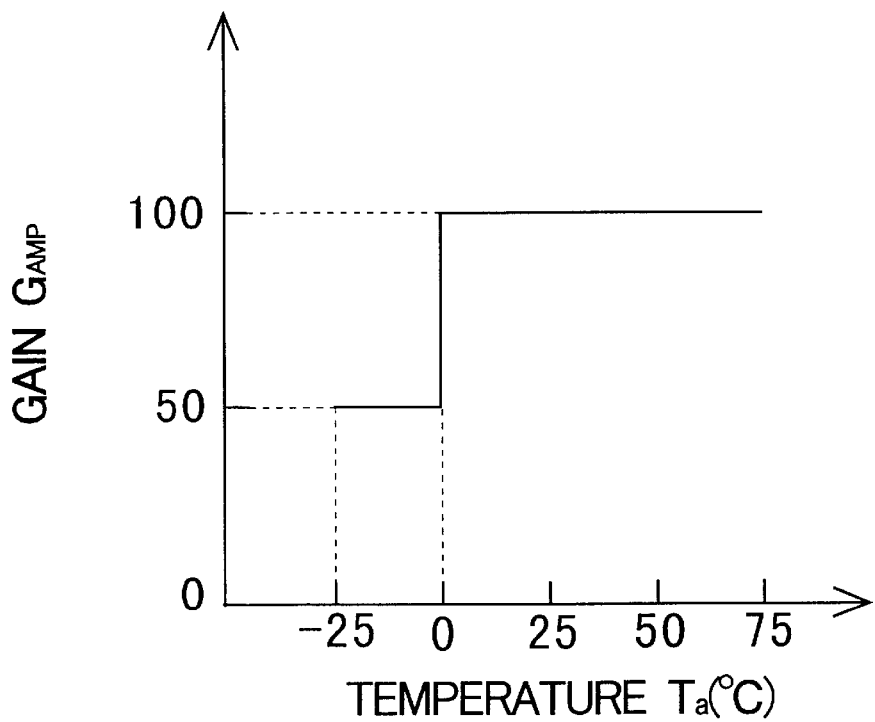
FIG. 6 is a graph showing the gain characteristic of the error amplifier provided in the switching power supply device shown in FIG. 3.

Next, the switching power supply device of a third embodiment of the invention will be described. FIG. 3 shows the switching power supply device of the third embodiment. In the following descriptions, such circuit elements and blocks as serve the same purposes as in FIG. 11 are identified with the same reference numerals or symbols, and their explanations will not be repeated. Here, a temperature detection circuit 14 detects the ambient temperature, and feeds the resulting detection signal to the gain control circuit 12. The gain control circuit 12, according to the detection signal fed from the temperature detection circuit 14, varies the gain $G_{AMP}$ of the error amplifier 7. Specifically, when the temperature $T_a$ detected by the temperature detection circuit 14 is higher than 0° C., the gain control circuit 12 sets the gain $G_{AMP}$ of the error amplifier 7 at 100 as in the conventional switching power supply device, and, when the temperature $T_a$ detected by the temperature detection circuit 14 is equal to or lower than 0° C., the gain control circuit 12 sets the gain $G_{AMP}$ of the error amplifier 7 at 50, as shown in FIG. 6.

Figure 7:
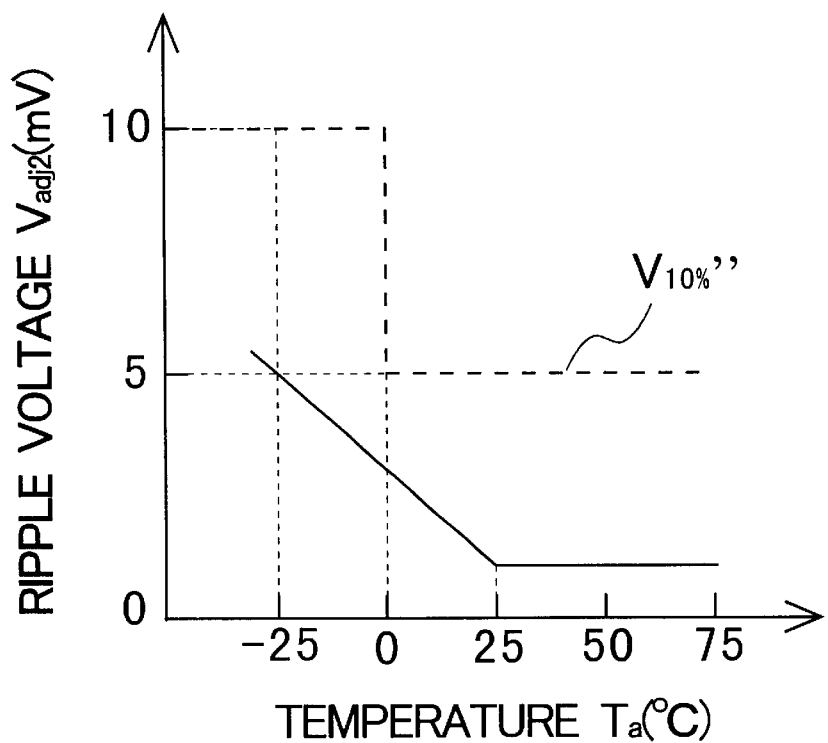
FIG. 7 is a graph showing the temperature characteristic of the ripple voltage contained in the divided voltage of the output voltage of the switching power supply device shown in FIG. 3.

As a result of this operation, the ripple voltage contained in the divided voltage $V_{adj}$ when a malfunction occurs at a duty factor "duty" of 10% is now, in the range of temperatures of 0° C. and below, as indicated by $V_{10\%}"$ in FIG. 7, i.e. twice as high as $V_{10\%}$ shown in FIG. 18. Thus, there no longer occurs a malfunction in which the switching frequency $f_0$ of the transistor 2 becomes equal to half the oscillation frequency of the oscillator 10 even at a duty factor of 10% and at a low temperature (−25° C.).

In the switching power supply device of the first or second embodiment, it is possible to additionally provide a temperature detection circuit and vary the gain $G_{AMP}$ of the error amplifier 7 according to the ambient temperature.

For example, in the switching power supply device of the first embodiment, the gain $G_{AMP}$ of the error amplifier 7 is made lower when the ambient temperature is equal to or lower than 0° C. than when the ambient temperature is higher than 0° C. Moreover, the gain $G_{AMP}$ of the error amplifier 7 is made lower when the ambient temperature is higher than 0° C. and in addition the divided voltage $V_{adj}$ is equal to or lower than 1.253 V than when the ambient temperature is higher than 0° C. and in addition the divided voltage $V_{adj}$ is higher than 1.253 V.

On the other hand, in the switching power supply device of the second embodiment, the gain $G_{AMP}$ of the error amplifier 7 is made lower when the ambient temperature is equal to or lower than 0° C. than when the ambient temperature is higher than 0° C. Moreover, the gain $G_{AMP}$ of the error amplifier 7 is made lower when the ambient temperature is higher than 0° C. and in addition the input-output ratio $V_{IN}/V_O$ is equal to or higher than 5 than when the ambient temperature is higher than 0° C. and in addition the input-output ratio $V_{IN}/V_O$ is lower than 5.

These configurations prevent the gain $G_{AMP}$ of the error amplifier 7 from being reduced too much in normal operation in the range of temperatures from 25 to 80° C. This helps ensure the stability of the output voltage $V_O$ against variation in the input voltage $V_{IN}$.

Figure 9:
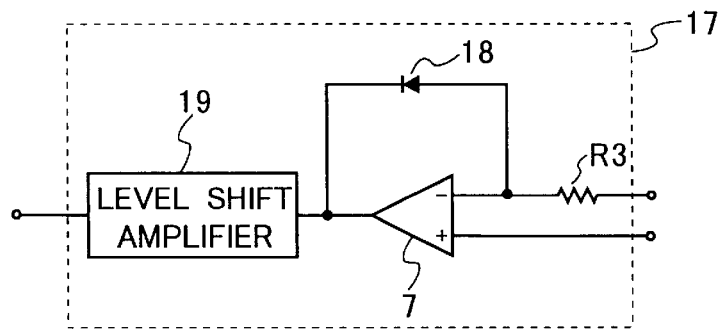
FIG. 9 is a diagram showing the configuration of the logarithmic amplifier.
Figure 10:
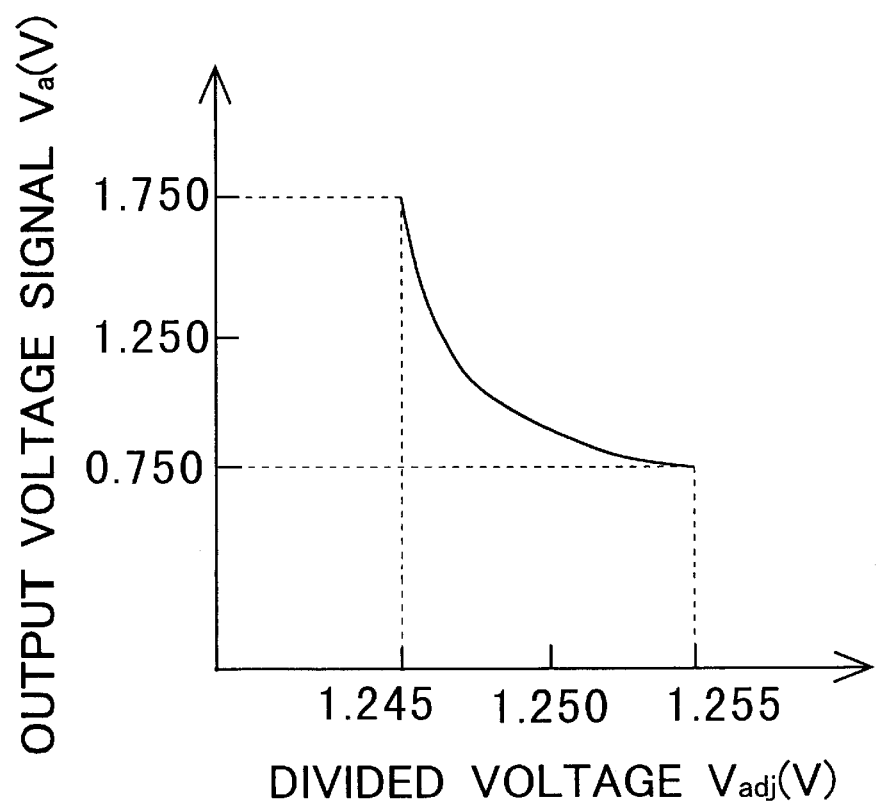
FIG. 10 is a graph showing the input-output characteristic of the logarithmic amplifier shown in FIG. 9.

In the first embodiment, as the error amplifier 7 provided with the gain control circuit 12, it is also possible to use a logarithmic amplifier 17 as shown in FIG. 9. The logarithmic amplifier 17 is provided with an error amplifier 7, a diode 18, a resistor R3, and a level shift amplifier 19. The error amplifier 7 has its inverting input terminal connected to the anode of the diode 18, and has its output terminal connected to the cathode of the diode 18. The node between the diode 18 and the inverting input terminal of the error amplifier 7 is connected to the resistor R3, and the node between the diode 18 and the output terminal of the error amplifier 7 is connected to the level shift amplifier 19. The level shift amplifier 19 adds a predetermined value to the signal fed thereto and then outputs the resulting signal as the output voltage signal $V_A$. Here, the divided voltage $V_{adj}$ and the output voltage signal $V_A$ have a relationship as shown in FIG. 10. Specifically, the higher the divided voltage $V_{adj}$, the lower the gain $G_{AMP}$. This makes it possible to realize the switching power supply device of the first embodiment with a cheaper and simpler configuration than that shown in FIG. 8. However, in this configuration, it is not possible to perform control so as to fulfill formula (8), and therefore it is not possible to make the total gain of the feedback system of the switching power supply device constant.

In the switching power supply devices of the first to third embodiments, a step-down type DC—DC converter is used as the DC—DC converter. However, the DC—DC converter used in the present invention is not limited to this specific type, but may be of any other type, such as a step-up or step-down/step-up type. For example, in general, a switching power supply device employing a step-up type DC—DC converter is used in the range of duty factors "duty" from 50% to 100%, and, the higher the duty factor "duty", the lower the ripple voltage $V_{adj1}$ at which a malfunction occurs. Therefore, it is advisable to lower the gain of the error amplifier at least when the duty factor of the PWM signal supplied to the switching transistor is high or when the ambient temperature is low.

In the switching power supply devices of the first to third embodiments, the error amplifier 7 is connected through the output voltage detection circuit 6 to the output terminal OUT so that the error amplifier 7 receives the divided voltage $V_{adj}$ of the output voltage $V_O$. However, the present invention is not limited to this specific configuration, but may be so implemented that the error amplifier 7 is connected directly to the output terminal OUT so that the error amplifier 7 receives the output voltage $V_O$. In this case, it is necessary to set the reference voltage $V_{ref}$ output from the reference voltage source 8 higher than in the switching power supply devices of the first to third embodiments.

What is claimed is:

1. A switching power supply device comprising:
   a DC—DC converter that receives an input voltage and outputs a varying voltage by varying a ratio of on periods to off periods of a switching transistor;
   a reference voltage source the outputs a predetermined reference voltage;
   an error amplifier that compares an output voltage of the DC—DC converter or a divided voltage thereof with the predetermined reference voltage and outputs an error voltage;
   an operator that produces a pulse signal according to the error voltage and controls the switching transistor with the pulse signal; and
   a gain control circuit that varies a gain of the error amplifier according to a duty factor of the pulse signal.

2. The switching power supply device as claimed in claim 1,
   wherein the gain control circuit varies the gain of the error amplifier according to the output voltage of the DC—DC converter or the divided voltage thereof.

3. The switching power supply device as claimed in claim 1,
   wherein the gain control circuit varies the gain of the error amplifier according to a ratio of the output voltage of the DC—DC converter and the input voltage.

4. The switching power supply device as claimed in claim 1,
   wherein the DC—DC converter is a step-down type DC—DC converter, and
   the gain of the error amplifier is made lower when the output voltage of the DC—DC converter or the divided voltage thereof is equal to or lower than a predetermined value than when the output voltage of the DC—DC converter or the divided voltage thereof is higher than the predetermined value.

5. The switching power supply device as claimed in claim 1,
   wherein the DC—DC converter is a step-down type DC—DC converter, and
   the gain of the error amplifier is made lower when a value obtained by dividing the input voltage by the output voltage of the DC—DC converter is equal to or greater than a predetermine value than when the value obtained by dividing the input voltage by the output voltage of the DC—DC converter is smaller than the predetermine value.

6. The switching power supply device as claimed in claim 1,
   wherein the gain control circuit varies the gain of the error amplifier in such a way that a value calculated by multiplying a value calculated by subtracting from 0.5 a product of the gain of the error amplifier, a value calculated by subtracting the reference voltage from the divided voltage of the output voltage of the DC—DC converter, and a rate of change of the duty factor of the pulse signal with respect to the error voltage by the gain of the error amplifier equals a predetermined value.

7. The switching power supply device as claimed in claim 1,
   wherein the gain control circuit varies the gain of the error amplifier in such a way that a value calculated by multiplying a value calculated by dividing the input voltage by the output voltage of the DC—DC converter and the gain of the error amplifier equals a predetermined value.

8. A switching power supply device comprising:
   a DC—DC converter that receives an input voltage and outputs a varying voltage by varying a ratio of on periods to off periods of a switching transistor;
   a reference voltage source the outputs a predetermined reference voltage;
   an error amplifier that compares an output voltage of the DC—DC converter or a divided voltage thereof with the predetermined reference voltage and outputs an error voltage;
   an operator that produces a pulse signal according to the error voltage and controls the switching transistor with the pulse signal;
   a gain control circuit that varies a gain of the error amplifier; and
   a temperature detection circuit that detects ambient temperature,
   wherein the gain control circuit varies the gain of the error amplifier according to an output signal of the temperature detection circuit.

9. The switching power supply device as claimed in claim 8,
   wherein the gain of the error amplifier is made lower when the ambient temperature is equal to or lower than a predetermined value than when the ambient temperature is higher than the predetermined value.

10. The switching power supply device as claimed in claim 8,
    wherein the gain control circuit varies the gain of the error amplifier according to a duty factor of the pulse signal and the ambient temperature.

11. The switching power supply device as claimed in claim 8,
wherein the gain control circuit varies the gain of the error amplifier according to the output voltage of the DC—DC converter or the divided voltage thereof and the output signal of the temperature detection circuit.

12. The switching power supply device as claimed in claim 8,
wherein the gain control circuit varies the gain of the error amplifier according to a ratio of the output voltage of the DC—DC converter to the input voltage and the output signal of the temperature detection circuit.

13. The switching power supply device as claimed in claim 8,
wherein the DC—DC converter is a step-down type DC—DC converter,
the gain of the error amplifier is made lower when the ambient temperature is equal to or lower than a predetermined value than when the ambient temperature is higher than the predetermined value, and
the gain of the error amplifier is made lower when the ambient temperature is higher than the predetermined value and in addition the output voltage of the DC—DC converter or the divided voltage thereof is equal to or lower than a predetermined value than when the ambient temperature is higher than the predetermined value and in addition the output voltage of the DC—DC converter or the divided voltage thereof is higher than the predetermined value.

14. The switching power supply device as claimed in claim 8,
wherein the DC—DC converter is a step-down type DC—DC converter,
the gain of the error amplifier is made lower when the ambient temperature is equal to or lower than a predetermined value than when the ambient temperature is higher than the predetermined value, and
the gain of the error amplifier is made lower when the ambient temperature is higher than the predetermined value and in addition a value obtained by dividing the input voltage by the output voltage of the DC—DC converter is equal to or greater than a predetermine value than when the ambient temperature is higher than the predetermined value and in addition the value obtained by dividing the input voltage by the output voltage of the DC—DC converter is smaller than the predetermine value.

15. A switching power supply device comprising:
a DC—DC converter that receives an input voltage and outputs a varying voltage by varying a ratio of on periods to off periods of a switching transistor;
a reference voltage source that outputs a predetermined reference voltage;
a logarithmic error amplifier that compares an output voltage of the DC—DC converter or a divided voltage thereof with the predetermined reference voltage and outputs an error voltage;
an operator that produces a pulse signal according to the error voltage and controls the switching transistor with the pulse signal.

* * * * *